US009843556B2

(12) United States Patent
Kim et al.

(10) Patent No.: US 9,843,556 B2
(45) Date of Patent: Dec. 12, 2017

(54) ADDRESS BOOK INFORMATION SERVICE SYSTEM, AND METHOD AND DEVICE FOR ADDRESS BOOK INFORMATION SERVICE THEREIN

(71) Applicant: SK PLANET CO., LTD., Seongnam-si, Gyeonggi-do (KR)

(72) Inventors: Jonghyun Kim, Seoul (KR); Hosung Joh, Seongnam-si (KR); Youngshin Yoon, Seoul (KR)

(73) Assignee: SK PLANET CO., LTD., Seongnam-si, Gyeonggi-Do (KR)

( * ) Notice: Subject to any disclaimer, the term of this patent is extended or adjusted under 35 U.S.C. 154(b) by 29 days.

(21) Appl. No.: 14/567,234

(22) Filed: Dec. 11, 2014

(65) Prior Publication Data
US 2015/0099548 A1    Apr. 9, 2015

Related U.S. Application Data

(63) Continuation of application No. PCT/KR2013/007727, filed on Aug. 28, 2013.

(30) Foreign Application Priority Data

Oct. 9, 2012  (KR) .................. 10-2012-0111615
Oct. 29, 2012 (KR) .................. 10-2012-0120372

(51) Int. Cl.
*H04L 29/12*    (2006.01)
*G06Q 50/30*   (2012.01)
(Continued)

(52) U.S. Cl.
CPC ......... *H04L 61/1594* (2013.01); *G06Q 10/10* (2013.01); *G06Q 50/30* (2013.01);
(Continued)

(58) Field of Classification Search
CPC .................................................. H04L 61/1594
See application file for complete search history.

(56) References Cited

U.S. PATENT DOCUMENTS

2004/0204117 A1    10/2004  Weiner
2007/0127702 A1*   6/2007   Shaffer .................. G06Q 10/10
                                                   379/355.04
(Continued)

FOREIGN PATENT DOCUMENTS

EP          1211906 A2      6/2002
EP          2175623 A1      4/2010
(Continued)

OTHER PUBLICATIONS

International Search Report for PCT/LR2013/007727 dated Dec. 6, 2013.
(Continued)

*Primary Examiner* — Mazda Sabouri
(74) *Attorney, Agent, or Firm* — Hauptman Ham, LLP (57) ABSTRACT

Provided are an address book information service system, and a method and a device for an address book information service therein, whereby: a terminal device in the address book information service system sets groups in an address book according to category information and transmits group information on the set groups and preset user information to a service device; the service device searches new address book information corresponding to the group information on the basis of the location of a user by using the group information and the user information and transmits the searched new address book information to the terminal device; and the terminal device automatically registers the received new address book information in the address book, thereby enabling the user to easily look up new address book information.

3 Claims, 7 Drawing Sheets

(51) Int. Cl.
*H04M 1/2745* (2006.01)
*H04M 1/725* (2006.01)
*G06Q 10/10* (2012.01)
*H04W 4/02* (2009.01)
*H04M 3/493* (2006.01)

(52) U.S. Cl.
CPC ..... *H04M 1/2745* (2013.01); *H04M 1/72572* (2013.01); *H04M 3/493* (2013.01); *H04W 4/02* (2013.01)

(56) References Cited

U.S. PATENT DOCUMENTS

| | | | |
|---|---|---|---|
| 2010/0144331 A1* | 6/2010 | Koberg | H04M 1/274583 455/418 |
| 2010/0205242 A1* | 8/2010 | Marchioro, II | G06Q 10/10 709/203 |
| 2012/0203821 A1* | 8/2012 | Czajka | G06Q 10/107 709/203 |
| 2013/0172014 A1* | 7/2013 | Kaul | H04W 4/025 455/456.3 |
| 2013/0217365 A1* | 8/2013 | Ramnani | H04L 67/306 455/414.1 |

FOREIGN PATENT DOCUMENTS

| | | |
|---|---|---|
| GB | 2425682 A | 11/2006 |
| KR | 1020050010368 A | 1/2005 |
| KR | 1020070082972 A | 8/2007 |
| KR | 100867540 B1 | 11/2008 |
| KR | 1020090038716 A | 4/2009 |
| WO | 2010/021420 A1 | 2/2010 |

OTHER PUBLICATIONS

European Search Report dated on Jul. 5, 2016 corresponding to European Patent Application No. 13846046.4.
European Search Report for corresponding European Patent Application No. 16187928.3 dated Nov. 17, 2016.

* cited by examiner

ADDRESS BOOK INFORMATION SERVICE SYSTEM, AND METHOD AND DEVICE FOR ADDRESS BOOK INFORMATION SERVICE THEREIN

CROSS REFERENCE TO RELATED APPLICATION

This instant application is a continuation of PCT/KR2013/007727, filed Aug. 28, 2013, which is based on and claims priority of Korean Patent Application No. 10-2012-0111615 and 10-2012-0120372 filed in the Korean Intellectual Property Office on Oct. 9, 2012 and Oct. 29, 2012, respectively, the entire contents of which are incorporated herein by reference.

TECHNICAL FIELD

The present invention relates to an address book information service system, and particularly, to an address book information service system in which new address book information found corresponding to a category requested by a user in the address book information service system is automatically registered and provided to the user, and interest information and closeness information with acquaintances registered in an address book may be displayed in an easily accessible manner, and a method and device for an address book information service.

BACKGROUND

Content described herein provides only background information of the present embodiment and does not configure the related art.

As the mobile communication industry develops, various services can be received through mobile communication devices. Recently, wireless Internet services can be received through smartphones and the like. Also, recent mobile communication devices include a default voice communication function and further implement various complex functions such as data communication, capturing a picture or a video using a camera, reproducing a music or video file, games, and broadcasting viewing.

Users share information and communicate with other users using such terminals at any time and any place. For example, users may make a call or send a text message to acquaintances, or transmit and receive messages with several people using a separate messenger program. Also, using separate applications, a server automatically pushes content that is uploaded on the web by another user to a user's terminal, and the user may easily identify the content that is uploaded by another user in the user's terminal without accessing the web.

As various community services through mobile communication devices are increasingly used, most users may use an address book service in which contacts of his or her personal connections or favorite stores are stored in an address book through mobile communication devices, and immediate search is performed as necessary to make a call. Store contact information of businesses of interest may be searched for through wireless Internet services and stored in the address book.

However, in address book services in the related art, address book information was registered in the address book by storing information directly input by the user, or address book information obtained through a message or a call sent to or received from a partner. Accordingly, from the viewpoint of the user, in order to register new address book information in the address book, there is an inconvenience in that the user should directly input information. Since address book services in the related art were not able to provide related information other than the registered address book information, utility of the address book was decreased.

In particular, when users go to another area due to moving, travel, and the like, telephone numbers of local amenities such as government offices, restaurants, schools, police stations, and cinemas should be searched for again and registered.

Also, in address book services in the related art, only basic information of other users, for example, name, address, and contact information, was simply stored and managed, and there was no function by which a relation between the user and other users could be displayed in an easily accessible manner such as how often the user communicates with registered acquaintances, and recent common interests with other users.

For reference, in mobile communication devices in the related art, a history of calls, text messages, or instant messages was managed. However, this was simply aligned and provided based on generation times and users, and it was difficult to recognize a relation with the user.

SUMMARY

The present invention is directed to providing an address book information service system in which new address book information is searched for using only a category requested by a user and the found address book information is automatically registered in an address book and provided for the user, and a method and device for an address book information service.

In particular, the present invention is directed to providing an address book information service system in which new address book information related to registered address book information is searched for based on current location information of the user corresponding to a category requested by the user, and provided to the user, and a method and device for an address book information service.

Also, the present invention is directed to providing an address book information service system in which interest information and closeness information between the user and a partner are extracted based on information such as the number of occurrences of calls and text between the user and another user and content thereof, and interest information and closeness information that can display these pieces of information in an easily accessible manner may be displayed, and a method and device for an address book information service.

According to an aspect of the present invention, there is provided an address book information service system. The system may include a terminal device configured to set a group of an address book according to category information, receive new address book information based on a found user location that is found using group information of the set group and preset user information, and automatically register the received new address book information in the address book; and a service device configured to receive the group information and the user information from the terminal device, use the received user information, recognize a location in which the terminal device is used, search for the new address book information corresponding to the received group information based on the recognized user location, and provide the found new address book information to the terminal device.

According to another aspect of the present invention, there is provided an address book information service system. The system may include a service device configured to collect and provide activity information of a terminal device of a specific partner from at least one preset community service device; and a terminal device configured to identify event information generated with a terminal device of a selected partner when a selection input to any partner among a plurality of pieces of address book information that are registered in an address book is detected, collect activity information of the partner from the service device, simultaneously align and display the event information and activity information, analyze interest information and closeness information between a user and the partner based on the event information and activity information, and display the closeness information through an icon corresponding to the interest information.

According to still another aspect of the present invention, there is provided a service device for an address book information service. The device may include a communication unit configured to communicate with a terminal device connected via a communication network for the address book information service; and a control unit configured to identify group information and user information received from the terminal device through the communication unit during a service request when the service request is received from the terminal device, use the identified user information, recognize a location of a user of the terminal device, search for new address book information corresponding to the group information based on the recognized location of the user, and transmit the found new address book information to the terminal device through the communication unit such that the information is automatically registered in an address book of the terminal device.

According to yet another aspect of the present invention, there is provided a service device for an address book information service. The device may include a communication unit configured to transmit and receive data with a plurality of terminal devices; a storage unit configured to store event information generated between the terminal devices; and a control unit configured to perform control such that event information generated between the terminal device and a terminal device of a partner is collected when a request for interest information and closeness information of a specific partner is received from any terminal device, activity information of the partner is collected from at least one preset community service device, interest information and closeness information between the user and the partner are analyzed based on the event information and activity information, and an icon corresponding to the interest information in which the closeness information is reflected, and the event information and activity information are transmitted to the terminal device.

According to yet another aspect of the present invention, there is provided a terminal device in an address book information service system. The device includes a communication unit configured to communicate with a service device connected via a communication network for an address book information service; a control unit configured to set a group of an address book according to category information, transmit group information of the set group and preset user information to the service device through the communication unit, receive new address book information based on a user's location found using the group information and the user information from the service device, and automatically register the received new address book information in the address book; and a storage unit configured to store the address book information registered in the address book as a group that is separated for each category.

According to yet another aspect of the present invention, there is provided a terminal device for an address book information service. The device includes an input unit for user selection; an output unit configured to display address book information of at least one partner; and a control unit configured to identify event information generated with a terminal device of the partner when a selection input to any partner among the at least one partner is detected through the input unit, request and collect activity information of the partner, perform control such that the event information and activity information are aligned and displayed on the output unit, simultaneously analyze interest information and closeness information between the user and the partner based on the event information and activity information, and display the closeness information through an icon corresponding to the interest information.

According to yet another aspect of the present invention, there is provided a method of an address book information service. The method includes, in a terminal device, executing an address book information service; setting a group according to category information and generating group information of the set group; transmitting the generated group information and preset user information to a service device configured to provide the address book information service, and requesting the address book information service; receiving new address book information found corresponding to the group information based on a user location identified using the user information from the service device; and automatically registering the received new address book information in the set group of the address book.

According to yet another aspect of the present invention, there is provided a method of an address book information service. The method includes, in a service device, receiving group information of a group set according to category information and user information from a terminal device configured to execute the address book information service; identifying a user location of the terminal device using the received user information; searching for new address book information corresponding to the received group information based on the identified user location; and providing the found new address book information to the terminal device.

According to yet another aspect of the present invention, there is provided a method of an address book information service. The method includes, in a terminal device, identifying event information generated between a user and a partner when a selection input to any partner among a plurality of pieces of address book information is detected; requesting and collecting activity information of the partner from a service device; analyzing interest information and closeness information between the user and the partner based on the event information and activity information; and displaying the closeness information through an icon corresponding to the interest information.

According to the embodiment of the present invention, using only category information input by the user, based on the user's location, new address book information of a nearby area corresponding to the category information is received and automatically registered in the address book. Therefore, the user has no need to directly search to obtain the address book information. Even when the user moves to a new area, the user may easily identify new address book information such as a telephone number, an address, and the like of a business of interest, by executing only the address book. Accordingly, it is possible to increase utility of the address book.

Also, according to another embodiment of the present invention, event information such as calls and text generated between the user and the partner and activity information on the web of the partner are collected using the terminal, the event information and activity information are displayed in an easily accessible manner, and interest information and closeness information between the user and the partner may be easily analyzed. The closeness information is displayed through an icon corresponding to the interest information. Therefore, the user may easily identify interest information and closeness information with the partner.

DETAILED DESCRIPTION

Hereinafter, exemplary embodiments of the invention will be described in detail with reference to the accompanying drawings. However, detailed descriptions of well-known functions or configurations that unnecessarily obscure the gist of the invention in the following explanations and accompanying drawings will be omitted. The same reference numbers will be used throughout this specification to refer to the same or like parts.

Terms and words used in this specification and claims should not be interpreted as limited to commonly used meanings or meanings in dictionaries and should be interpreted with meanings and concepts which are consistent with the technological scope of the invention based on the principle that the inventors have appropriately defined concepts of terms in order to describe the invention in the best way. Therefore, since the embodiments described in this specification and configurations illustrated in drawings are only exemplary embodiments and do not represent the overall technological scope of the invention, it is understood that the invention covers various equivalents, modifications, and substitutions at the time of filing of this application.

First, an address book information service system according to an embodiment of the present invention will be described in detail with reference to the accompanying diagrams.

Figure 1:
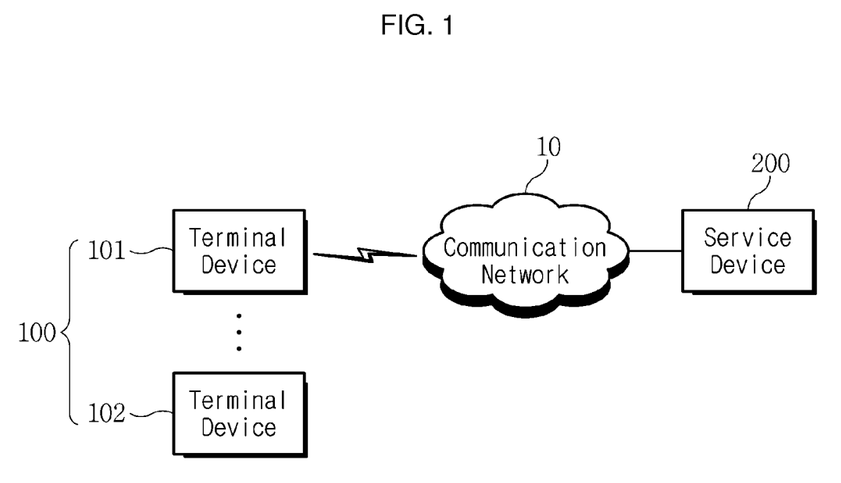
FIG. 1 is a diagram illustrating a configuration of an address book information service system according to an embodiment of the present invention.

FIG. 1 is a diagram illustrating a configuration of an address book information service system according to an embodiment of the present invention.

As illustrated in FIG. 1, the address book information service system may include a plurality of terminal devices 100 for an address book service and a service device 200 which are connected via a communication network 10.

The terminal device 100 refers to a terminal capable of transmitting and receiving various pieces of data according to a user's key manipulation via the communication network 10, and may be any of a tablet PC, a laptop, a personal computer (PC), a smartphone, a personal digital assistant (PDA), a mobile communication terminal, and the like.

Also, the terminal device 100 refers to a terminal that performs voice or data communication via the communication network 10, and includes a browser configured to communicate with the service device 200 via the communication network 10, a memory configured to store a program and a protocol, a microprocessor configured to execute, compute and control various programs, and the like. That is, the terminal device 100 may include any terminal as long as it can perform server-client communication with the service device 200, and broadly includes a communication computing device such as a notebook computer, the mobile communication terminal, and the PDA. Meanwhile, it is preferable that the terminal device 100 be manufactured in the form of a touchscreen, but the present invention is not limited thereto.

The terminal device 100 may receive an address book information service from the service device 200, join the address book information service, download a related application, and receive and execute a location identifying service through the application. Specifically, the terminal device 100 transmits group information according to category information input by the user and user information to the service device 200, receives new address book information that is found using the group information and the user information from the service device 200, and may automatically register the new address book information in an address book.

The service device 200 wirelessly communicates with the terminal device 100 and provides the address book information service. Also, the service device 200 receives a service request message including group information and user information from the terminal device 100, recognizes the user's location using the received user information, searches for new address book information using the received group information at the recognized user location, and provides the found new address book information to the terminal device 100. For example, when the user moves to an area other than a registered area and a telephone number of a restaurant or a store that is desired in a currently located area is not registered in the user's address book, the service device 200 receives a service request from the user's terminal device 100 and searches for new address book information.

Also, in the present invention, the address book information may further include information on a community history of registered acquaintances in addition to contact information.

Further, in another embodiment of the present invention, the address book information service system analyzes interest information and closeness information between a user and a partner based on a call event and a message event generated between the user and the partner and information on an activity of the partner in a space such as a web, and may provide the result to the user in an easily accessible manner.

For this purpose, the plurality of terminal devices 100 store and manage information on a plurality of events generated between the user and another terminal device generated in the terminal device 100 in the form of a history, receive activity information of another terminal device from the service device 200, and then the terminal device 100 may analyze interest information and closeness information of the user of another terminal device. However, the present invention is not limited thereto. When the service device 200 stores information on events generated between the user and the partner, the service device 200 analyzes interest information and closeness information, and may transmit only the analysis result to the terminal device 100. Here, another terminal device may be a terminal device of an acquaintance included in the address book information.

The terminal device 100 may support transmission and reception of a call, a text message, an instant messaging (IM) message, and the like among a plurality of users. This will be described in detail below.

First, when an incoming or outgoing event of a call, a text message, or an IM message with another terminal device is generated according to a request from the user, the plurality of terminal devices 100 store event information corresponding to identification information of another terminal device, for example, a telephone number, a user ID, and an IP address.

Also, the plurality of terminal devices 100 may store and manage identification information of a plurality of partners, for example, a telephone number, a user ID, and an IP address through the address book information, and may display pre-stored address book information according to a request from the user.

In this case, when selection of any partner among identification information of the plurality of partners displayed in the address book is detected, the plurality of terminal devices 100 collect pre-stored event information corresponding to identification information of the partner, for example, a telephone number. Then, the terminal device 100 transmits identification information of the partner to the service device 200, and requests activity information of the partner.

Here, the activity information may include content information that is opened according to a request from the partner among content written on a personal home page of the partner, a personal content service such as a blog, a social network service (SNS) and the like.

While information on a personal content service, an SNS service, and the like of the partner is stored to correspond to identification information of the partner, the service device 200 collects information on content used by the partner and another terminal device according to a request from the terminal device 100, and transmits the result to the terminal device 100.

Here, the activity information may include content details, information on a location in which content is posted, and information on a content generation time.

Also, the terminal device 100 that has received the activity information may align and display the event information and activity information. That is, when the user's selection input to any partner among identification information of partners displayed in the address book is detected, the terminal device 100 collects information on events between the user and the partner, and requests and collects the activity information from the service device 200.

When collection is completed, the terminal device 100 moves to a menu in which a history of the partner among the address book information is identifiable, and aligns and displays the event information and activity information through the history.

In this case, preferably, generation time information of the event information and activity information may be aligned and displayed in descending order. In this case, details related to the event such as a kind of an event, the number of occurrences of the event, a generation time, and the like may be displayed together.

Also, the terminal device 100 aligns and displays the event information and activity information based on generation time information, analyzes interest information and closeness information between the user and the partner based on the event information and activity information, and may display the closeness information through a preset icon corresponding to the interest information.

In this case, the interest information may be analyzed based on content of the event information and activity information, and the closeness information may be analyzed based on the number of occurrences of the event information.

A method of analyzing and displaying the interest information and closeness information will be described in greater detail below.

The terminal device 100 and the service device 200 are linked via the communication network 10. The communication network 10 refers to a network in which data can be transmitted and received through an Internet protocol using various pieces of wired and/or wireless communication technology such as an Internet network, an intranet network, a mobile communication network, and a satellite communication network. For example, the communication network 10 collectively refers to a closed network such as a local area network (LAN), and a wide area network (WAN), an open network such as the Internet, a network such as code division multiple access (CDMA), Wideband Code Division Multiple Access (WCDMA), Global System for Mobile Communications (GSM), Long Term Evolution (LTE), and Evolved Packet Core (EPC), and a next generation network and a computing network to be implemented.

In the address book information service system configured in this manner, a configuration of the terminal device 100 according to an embodiment of the present invention will be described in detail with reference to FIG. 2.

Figure 2:
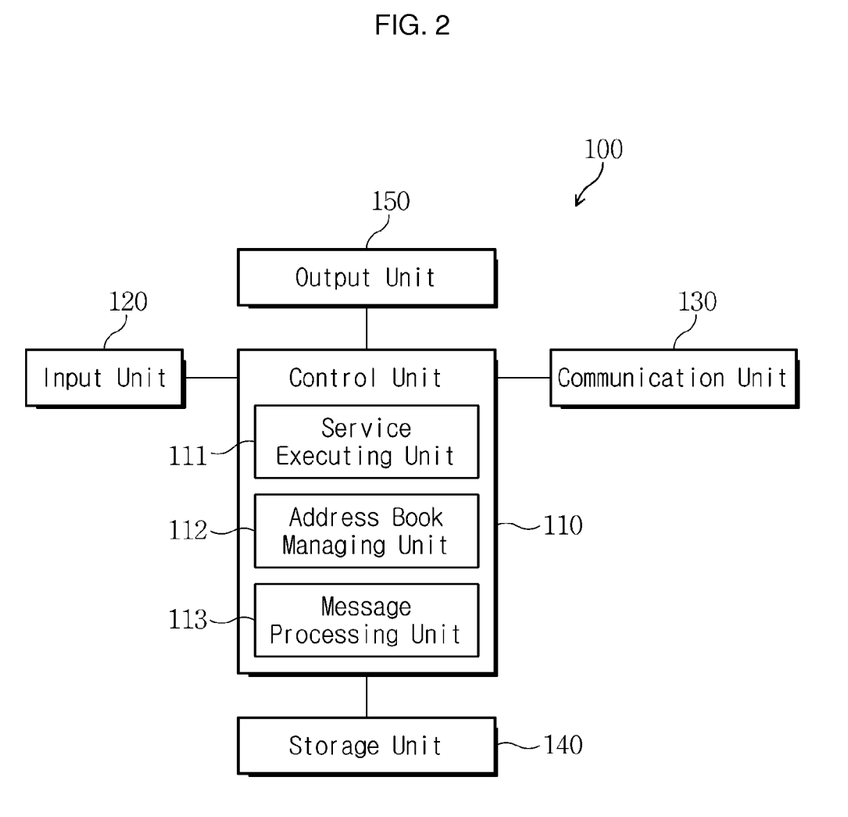
FIG. 2 is a diagram illustrating a configuration of a terminal device for an address book information service in an address book information service system according to an embodiment of the present invention.

As illustrated in FIG. 2, the terminal device 100 may include a control unit 110, an input unit 120, a communication unit 130, a storage unit 140, and an output unit 150.

The control unit 110 controls overall operations of the terminal device 100 and an operation related to a location identifying service, receives the address book information service from the service device 200, and may perform the address book information service according to a request from the user. For this purpose, the control unit 110 may include a service executing unit 111, an address book managing unit 112, and a message processing unit 113.

The service executing unit 111 executes an address book information service application provided from the service device 200 according to a request from the user, may perform control such that an address book screen is displayed on the output unit 150, and thereby the user is able to input category information through the input unit 120. Also, the service executing unit 111 may perform control such that new address book information provided from the service device 200 is displayed on a screen of the output unit 150.

The address book managing unit 112 may manage the address book stored in the storage unit 140, register address book information input by the user through the input unit 120 in the address book, and set a group by separating a name, a telephone number, and the like registered in the address book according to a category selected by the user. In particular, the address book managing unit 112 identifies category information when the user inputs category information through the input unit 120 on an address book information service screen while the address book information service is executed, and may generate a group according to input category information when a group according to the identified category information is not set. In this case, when there is a group according to the input category information, the address book managing unit 112 browses the group corresponding to the category information.

Then, the address book managing unit 112 generates information on the group corresponding to the input category information, and delivers the generated group information to the message processing unit 113. Here, the category information is information on a pre-generated group name or information necessary for generating a group, and may be a name of a restaurant, a store, and the like. For example, when the user wants to know a location of a chicken restaurant in a current area, the user may input the term "chicken" as category information through the input unit 120. Accordingly, the address book managing unit 112 recognizes the input term "chicken" as the category information, browses a group preset for chicken, or may newly set a group for chicken.

Also, the address book managing unit 112 receives new address book information that is provided from the service device 200 through the message processing unit 113 and automatically registers the new address book information in the address book. In this case, the address book managing unit 112 also receives group information (a group identifier) from the message processing unit 113, and stores the new address book information in a corresponding group of the address book through the group identifier. In this case, the address book managing unit 112 may perform control such that the received address book information is displayed on the address book information service screen of the output unit 150. Here, the new address book information may be received and displayed in the form of a text message, stored in a message inbox and the like, and identified through message search. In this case, the user may directly call the telephone number and the like included in the text message.

The message processing unit 113 generates a service request message including group information generated in the address book managing unit 112 and pre-stored user information, and transmits the generated service request message to the service device 200 through the communication unit 130.

Also, the message processing unit 113 receives a service request response message through the communication unit 130, analyzes the service request response message, identifies new address book information that is found using group information and user information from the service device 200, and delivers the identified new address book information to the address book managing unit 112. Here, the service request response message may include search result information such as search success and failure, group information, found new address book information, user evaluation information related to new address book information, and the like. The new address book information may be automatically registered in a corresponding group of the address book.

Meanwhile, the control unit 110 may also perform control such that new address book information provided from the service device 200 at a current location through the service executing unit 111 is applied to a navigation and map application installed in the terminal device 100, and the new address book information is displayed on a navigation and map screen. For example, the service executing unit 111 executes a pre-installed map or navigation application, and sets the executed application to access the address book. For example, when category information requested by the user is "chicken" and telephone number and location information of a chicken restaurant that is frequently used by the user is received from the service device 200 as new address book information related to chicken, the service executing unit 111 may perform control such that the received telephone number and location information of the chicken restaurant is displayed on a map displayed on a map executing screen.

The input unit 120 may generate a user input signal corresponding to a user request or information according to the user's manipulation. The input unit 304 may be implemented by currently available input devices or input devices to be commercialized. Examples of the input unit may include general input devices such as a keyboard, a mouse, a joystick, a touch screen, and a touch pad, and gesture input devices in which the user's motion is detected and a specific input signal is generated. In particular, in order to receive the new address book information from the service device 200 and automatically register the received information in the address book, the input unit 120 receives category information from the user and transmits the received input information to the control unit 110.

The communication unit 130 communicates with the service device 200 via the communication network 10, and transmits and receives messages for the address book information service. The communication unit 130 may transmit and receive data through various communication methods in addition to wired and wireless methods. Further, the communication unit 130 may transmit and receive data using at least one communication method. For this purpose, the communication unit 130 may include a plurality of communication modules configured to transmit and receive data according to different communication methods. In particular, the communication unit 130 transmits the service request message generated in the control unit 110 to the service device 200, receives the service request response message including the new address book information from the service device 200, and transmits the result to the control unit 110.

The storage unit 140 includes an address book database in which address book information including a telephone number, a name, an address, an email, and the like is stored. The storage unit 140 stores information about the address book information service, that is, information on an application for the address book information service received from the service device 200, and may store new address book information received according to a service request in a corresponding group of the address book database. The storage unit 140 includes magnetic media such as a hard disk, a floppy disk, or a magnetic tape, optical media such as a compact disk read only memory (CD-ROM) or a digital video disk (DVD), magneto-optical media such as a floptical disk, a ROM, a random access memory (RAM), or a flash memory.

The output unit 150 enables an operation result or a state of the terminal device 100 to be recognized by the user. Examples of the output unit may include a display unit configured to visually output the result and state through a screen or a speaker configured to output audible sound. In particular, in the present invention, an application screen related to the address book information service operated in the terminal device 100 may be displayed, the address book screen may be displayed according to a request from the user, and the new address book information provided from the service device 200 may be displayed. Also, the output unit 150 may display information on user evaluation in association with the new address book information, and may also display a screen for the user to input user evaluation in association with the new address book information. Also, the output unit 150 applies the new address book information to another service provided from the terminal device 100, for example, a map application or a navigation application, and may display the result on a corresponding screen.

Meanwhile, as described above, in another embodiment of the present invention, the terminal device 100 analyzes a relation between the partner and the user included in the address book information, and may display interest information of the partner and closeness with the user.

That is, in another embodiment of the present invention, the communication unit 130 may transmit and receive a call connection, a text message, and an IM message with another terminal device. Also, under control of the control unit 110, activity information of a specific partner may be requested and received from the service device 200.

In this case, the output unit 150 may display information on the plurality of partners through the address book information and sequentially display information on events generated with the partner, including a call event, a message event, and the like, or may display the activity information received from the service device 200 as history information.

Also, the control unit 110 performs control such that identification information of the plurality of partners registered in the address book that is managed by the address book managing unit 112, for example, a telephone number list, is displayed on the output unit 150, and when any telephone number of the displayed list is selected through the input unit 120, identifies a pre-stored event information history corresponding to identification information of the selected partner.

That is, when the control unit 110 is able to link with a specific messenger program in addition to the generated call event and message event corresponding to identification information of the selected partner, various pre-stored pieces of event information corresponding to the telephone number such as a message event transmitted and received through the messenger program may be collected.

Then, the control unit 110 transmits identification information of the partner, for example, a telephone number, to the service device 200, and may request activity information corresponding to the telephone number. The service device 200 identifies a community service set by the partner corresponding to the telephone number, for example, a service such as a personal home page, a blog, and an SNS. Then, it is identified whether there is content information opened by the partner among content written using the identified service, and opened content information is collected and transmitted to the terminal device 100. In this case, when the partner sets the activity information as private information, a message for notifying that there is no activity information may be transmitted to the terminal device 100.

When the activity information transmitted from the service device 200 is received through the communication unit 130, the control unit 110 analyzes the interest information and closeness information between the user and the partner based on previously collected event information and the collected activity information.

Here, the interest information may be analyzed based on content of the event information and activity information, and the closeness information may be analyzed based on the event information.

In particular, the interest information may be a relation between the user and the partner or a recent main interest. In order to analyze the interest information, the control unit 110 may set a keyword corresponding to the interest information in advance, or extract a keyword that is most frequently shown according to the number of extractions as the interest information.

For example, content of the message event transmitted and received between the user and the partner is analyzed. When the result shows that there are a large number of keywords such as "school," "teacher," "leave early," and "absence," the relation between the user and the partner may be "friend."

On the other hand, when the analysis result of content of the message transmitted and received between the user and the partner shows that there are a large number of keywords such as "travel," "Europe," and "France," it can be understood that the user and the partner are currently very interested in "travel." Also, when a keyword of "games" is more frequently shown than a keyword of "movies," it can be understood that the partner is very interested in "games."

In this manner, while a keyword that can be interest information is stored in advance, the control unit 110 extracts a pre-stored keyword from content of event information between the user and the partner, and analyzes the interest information using the keyword. In this case, the interest information may also be analyzed based on content of the activity information of the partner.

Also, when there are a plurality of pieces of event information and activity information between the user and the partner, the control unit 110 may extract interest information based on only recent information, for example, information from the past week.

On the other hand, the closeness information may be analyzed according to the number of occurrences of event information between the user and the partner. For example, when the number of occurrences of event information between the user and a first partner is four in total including 1 call event and 3 message events, and the number of occurrences of event information between the user and a second partner is 20 in total including 10 call events and 10 message events, it can be understood that the user is closer to the first partner than the second partner.

In this case, a certain level of weight may also be assigned to recently generated event information. In other words, when the number of occurrences of event information with the first partner is 10 in total and the number of occurrences of event information with the second partner is 20 in total, but the event information with the first partner includes events that were generated during the past week and the event information with the second partner includes event information that was generated before the past week, closeness with the first partner may be analyzed to have recently been increasing.

In this manner, in consideration of the number of occurrences of event information between the user and the partner, the closeness information may be analyzed. The closeness information in this case may be analyzed into grades. In other words, the closeness information may be analyzed into grades such that, when the number of occurrences of event information is 30 or more, closeness is a top grade 5, and when the number of occurrences of event information is between 25 and 30, closeness is a grade 4.

Then, the control unit 110 aligns and displays the event information and activity information collected for a selected partner on the output unit 150 in descending order based on generation time information, and a preset icon corresponding to the interest information is displayed together in a certain area in which the information is displayed.

For example, when the user and the partner are users who are very interested in "travel," the preset icon may be a "travel bag" corresponding to "travel." Also, when the user and the partner are users who are very interested in a "game," the preset icon may be a "game character" corresponding to the "game." Also, when the user and the partner have a "romantic" relation, the preset icon may be a "heart" corresponding to "romantic."

In this manner, the preset icon is displayed for each of various pieces of interest information, and closeness information is displayed in the icon. For example, when the preset icon is the "heart" corresponding to interest information and closeness information is "5," the "heart" may be controlled to be displayed as a filled "heart." On the other hand, when the closeness information is "1," the "heart" may be controlled to be displayed as an empty "heart."

According to another embodiment of the present invention, the event information and activity information generated between the user and the partner is displayed in an easily accessible manner, and the interest information and the closeness information between the user and the partner are analyzed and displayed in the form of an icon. The user may easily identify relations with the plurality of partners.

Figure 3:
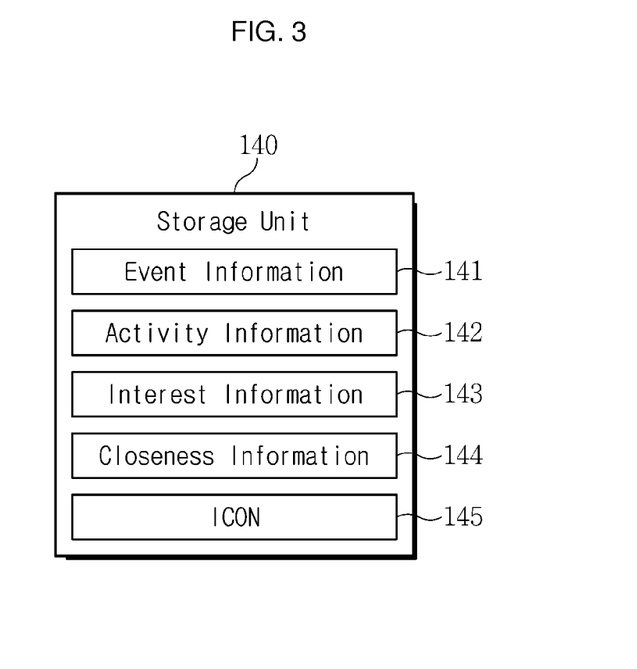
FIG. 3 is a block diagram illustrating a detailed configuration of a storage unit of a terminal device according to an embodiment of the present invention.

For this purpose, as illustrated in FIG. 3, the storage unit 140 of the present invention may store various pieces of event information 141 generated with the partner and the activity information 142 collected by the service device 200. Also, the storage unit 140 may store interest information 143 and closeness information 144 analyzed based on the event information 141 and the activity information 142, and may store information on a preset icon 145 corresponding to the interest information 143.

In this manner, main components of the terminal device 100 were described with reference to FIG. 2. However, not all of the components illustrated in FIG. 2 are essential components, and the terminal device 100 may be implemented by more components than the illustrated components, or the terminal 100 may be implemented by fewer components than the illustrated components.

Next, a configuration of the service device 200 according to the embodiment of the present invention will be described in detail with reference to FIG. 4.

Figure 4:
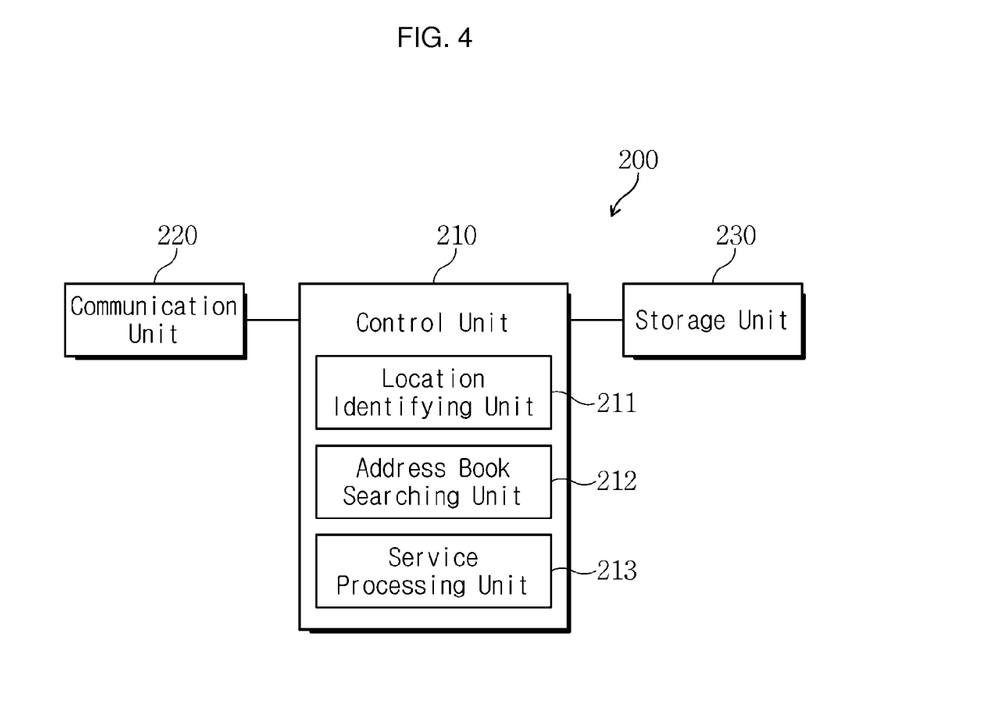
FIG. 4 is a diagram illustrating a configuration of a service device for an address book information service in an address book information service system according to an embodiment of the present invention.

As illustrated in FIG. 4, the service device 200 of the present invention may include a control unit 210, a communication unit 220, and a storage unit 230.

The control unit 210 performs control of overall operations of the service device 200 and operations for a location identifying service, uses group information and user information of the address book received from the terminal device 100, searches for new address book information corresponding to the group information at a current location, and transmits the found new address book information to the terminal device 100. For this purpose, the control unit 210 may include a location identifying unit 211, an address book searching unit 212, and a service processing unit 213.

The location identifying unit 211 identifies user information included in a service request message that is received from the terminal device 100 through the communication unit 220, and identifies a current location of the user using the identified user information. In this case, in order to identify a location of the user, the location identifying unit 211 may use various methods in which a GPS signal or a base station signal is detected to recognize a current location of the user.

The address book searching unit 212 identifies group information included in a service request message received from the terminal device 100 through the communication unit 220, searches for new address book information corresponding to the identified group information, and transmits the found new address book information to the service processing unit 213. In this case, the address book searching unit 212 detects address book information that is previously frequently used based on previous call history information or registered address book information, and may search for new address book information corresponding to the detected address book information at a current location. Also, the address book searching unit 212 may search for nearby related address book information corresponding to category information (a group name) included in the group information, that is, telephone numbers of related businesses and the like.

Also, when users using a service use a store of corresponding address book information and the like and then register user evaluations, the address book searching unit 212 may receive and manage information on the registered user evaluations, and select and extract the found address book information according to the user evaluations when the address book is searched. That is, the address book searching unit 212 identifies user evaluation of the found address book information to be managed when the address book is searched, and when the user evaluation is bad, excludes the store from the search result. For this purpose, a selection item for receiving category information may be included in an address book information service screen executed in the terminal device 100. Here, user evaluation information may be provided together to the terminal device 100 when the found new address book information is provided. In the terminal device 100, user evaluation information may also be stored in the address book, or stored in a separate storage space using a connection identifier.

Meanwhile, if the user has requested an automatic notification service based on interest information that is registered in advance when signing up, when the user moves to a new area, the address book searching unit 212 may search for new address book information based on the pre-registered interest information without a request from the user and transmit the result to the service processing unit 213.

The service processing unit 213 processes the service request message that is received from the terminal device 100 through the communication unit 220, identifies group information and location information included in the service request message, transmits the identified group information to the address book searching unit 212, and transmits the identified location information to the location identifying unit 211.

Also, the service processing unit 213 generates a service request response message including group information (a group identifier) and new address book information found by the address book searching unit 212, and transmits the generated service request response message to the terminal device 100.

Also, the service processing unit 213 stores the found new address book information in a search history database of the storage unit 230, and when an event related to the found new address book information is generated, may transmit information on the generated event to the terminal device 100 through a text message.

The communication unit 220 transmits and receives messages for the address book information service with the terminal device 100 through the communication network 10. The communication unit 220 may transmit and receive data through various communication methods in addition to wired and wireless methods. Further, the communication unit 220 may transmit and receive data using at least one communication method. For this purpose, the communication unit 220 may include a plurality of communication modules configured to transmit and receive data according to different communication methods. In particular, the communication unit 220 transmits the service request message received from the terminal device 100 to the control unit 210, and transmits the service request response message generated in the control unit 210 to the terminal device 100. Also, the communication unit 220 transmits a message for providing a generated event related to the terminal device 100 and the new address book information to the terminal device 100 via the communication network 10.

The storage unit 230 stores related information for providing the address book information service. Specifically, the storage unit 230 stores information on signing up received from the terminal device 100 when signing up for the address book information service, and group information and user information received according to the service request, and may store the found new address book information in the search history database. Also, the storage unit 230 may store the previous call history information, address book information registered in the address book, and the like, and this information may be managed in a separate server device, received according to a search request of the service device 200, and temporarily stored. The storage unit 230 includes magnetic media such as a hard disk, a floppy disk, or a magnetic tape, optical media such as a compact disk read only memory (CD-ROM) or a digital video disk (DVD), magneto-optical media such as a floptical disk, a ROM, a random access memory (RAM), and a flash memory.

Also, according to another embodiment of the present invention, the service device 200 may support analysis of interest information and closeness information between the user and a specific partner.

For this purpose, when an activity information request of another terminal device user (hereinafter referred to as a "partner") from the terminal device 100 is received through the communication unit 220, the control unit 210 may further perform a function of controlling such that activity information of another terminal device is collected and transmitted to the terminal device 100.

Here, the activity information may include content information that is posted through a community service used by another terminal device user, for example, a personal content service such as a personal home page and a blog, an SNS, and the like. As the activity information to be collected, the user of another terminal device may set collection conditions such that the user of another terminal device collects only content information that is set in an open state. Then, the control unit 210 performs control such that the collected activity information is transmitted to the terminal device 100.

Furthermore, the control unit 210 collects the event information and activity information, analyzes interest information and closeness information based on the collected information, and may transmit icon information corresponding thereto to the terminal device 100.

For this purpose, it is preferable that the service device 200 store event information generated with other terminal devices in the storage unit 230 for each terminal device. Then, when a request for interest information and closeness information with a specific partner is received from any terminal device, event information generated between the two terminal devices 100 is collected, activity information with the partner is collected, and interest information and closeness information between the user and the partner are analyzed based on the event information and activity information as described above.

Then, an icon corresponding to the interest information in which closeness information is reflected is transmitted along with the event information and activity information to the terminal device 100. Then, the terminal device 100 aligns and displays the received event information and activity information based on a generation time, and simultaneously displays an icon corresponding to the interest information in which the closeness information is reflected. Therefore, the user may easily identify interest information and closeness information with acquaintances registered in the address book.

Main components and operation methods of the service device 200 according to the embodiment of the present invention have been described above.

The above-described service device 200 of the present invention may be implemented as at least one server that is operated by a server-based computing method or a cloud method. In particular, services according to another embodiment of the present invention may be provided through a cloud computing environment. Here, cloud computing refers to technology for providing virtualized information technology (IT) resources such as hardware (for example, a server, a storage, or a network), software (for example, a database, security, or a web server), services, or data on demand utilizing Internet technology in a digital terminal such as a desktop, a tablet computer, a laptop computer, a netbook or a smartphone. That is, according to the present invention, all information transmitted and received between the terminal device 100 and the service device 200 may be stored in a cloud computing device on the Internet and may be transmitted at any time and any place.

Next, operations of the address book information service system configured in this manner will be described in greater detail with reference to FIGS. 5 to 10.

Figure 5:
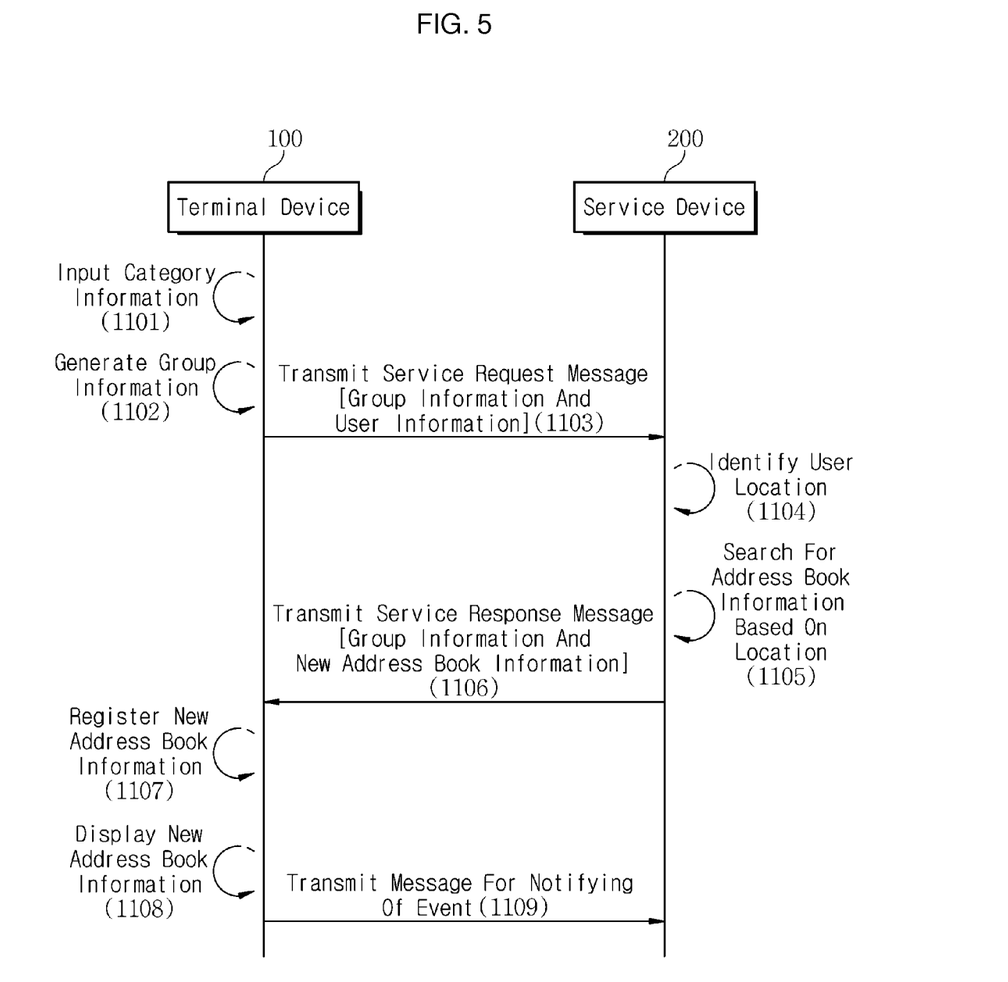
FIG. 5 is a message flowchart illustrating a method of an address book information service in an address book information service system according to an embodiment of the present invention.

First, FIG. 5 is a diagram illustrating a method of an address book information service according to an embodiment of the present invention.

Before description, the terminal device 100 and the service device 200 transmit and receive messages for registering a membership for the address book information service and receiving an application from the service device 200. The terminal device 100 installs an application for the address book information service provided from the service device 200, registers address book information input by the user in the address book, separates the registered address book information for each category, and may preset and manage groups.

As illustrated in FIG. 5, in operation 1101, the terminal device 100 executes the address book information service according to an address book information service request from the user, and receives category information from the user through an address book information service screen.

In operation 1102, the terminal device 100 generates group information of a corresponding group of the address book according to the received category information. In this case, the terminal device 100 identifies the received category information and identifies whether there is a preset group. When there is a group corresponding to the category information, the corresponding group is browsed and group information is generated. On the other hand, when there is no group information corresponding to the category information, a group corresponding to the category information is set and then group information of the set group is generated.

Then, in operation 1103, the terminal device 100 generates a service request message including the generated group information and preset user information, and transmits the generated service request message to the service device 200.

Accordingly, in operation 1104, the service device 200 identifies the group information and user information included in the service request message received from the terminal device 100, and recognizes a current location of the user using the identified user information.

Then, in operation 1105, the service device 200 searches for new address book information corresponding to the group information based on the recognized user location. In this case, the service device 200 detects address book information that is previously frequently used based on previous call history information or registered address book information, and may search for new address book information corresponding to the detected address book information at a current location. Also, the service device 200 may search for nearby related address book information corresponding to category information (a group name) included in the group information, that is, telephone numbers of related businesses and the like. For example, when a group name (category information) included in the group information is "chicken," the service device 200 identifies a chicken restaurant name that is previously frequently used based on previous call history information of the user corresponding to "chicken" or address book information of the group, and searches for address book information such as a telephone number, an address, and the like of a chicken restaurant corresponding to the identified chicken restaurant name at a current location. Here, the service device 200 searches for address book information that it manages itself or may collect and search for address book information that is managed by another server device through communication with the other server device.

Then, in operation 1106, the service device 200 includes the found new address book information in a service response request message along with the group information (a group identifier) and transmits the message to the terminal device 100.

Accordingly, in operation 1107, the terminal device 100 receives the service response request message, and automatically registers new address book information included in the received service response request message in a group of the address book corresponding to the group information.

In operation 1108, the terminal device 100 displays new address book information through the address book information service screen.

Then, in operation 1109, when an event of the found new address book information is generated, the service device 200 transmits a text message for notifying of the event to the terminal device 100.

Through the above-described operations, the present invention may newly update address book information included in a specific category among information registered in the address book according to the location of the user.

Next, in the address book information service according to the present invention, a method of displaying interest information and closeness information will be described with reference to FIG. 6.

Figure 6:
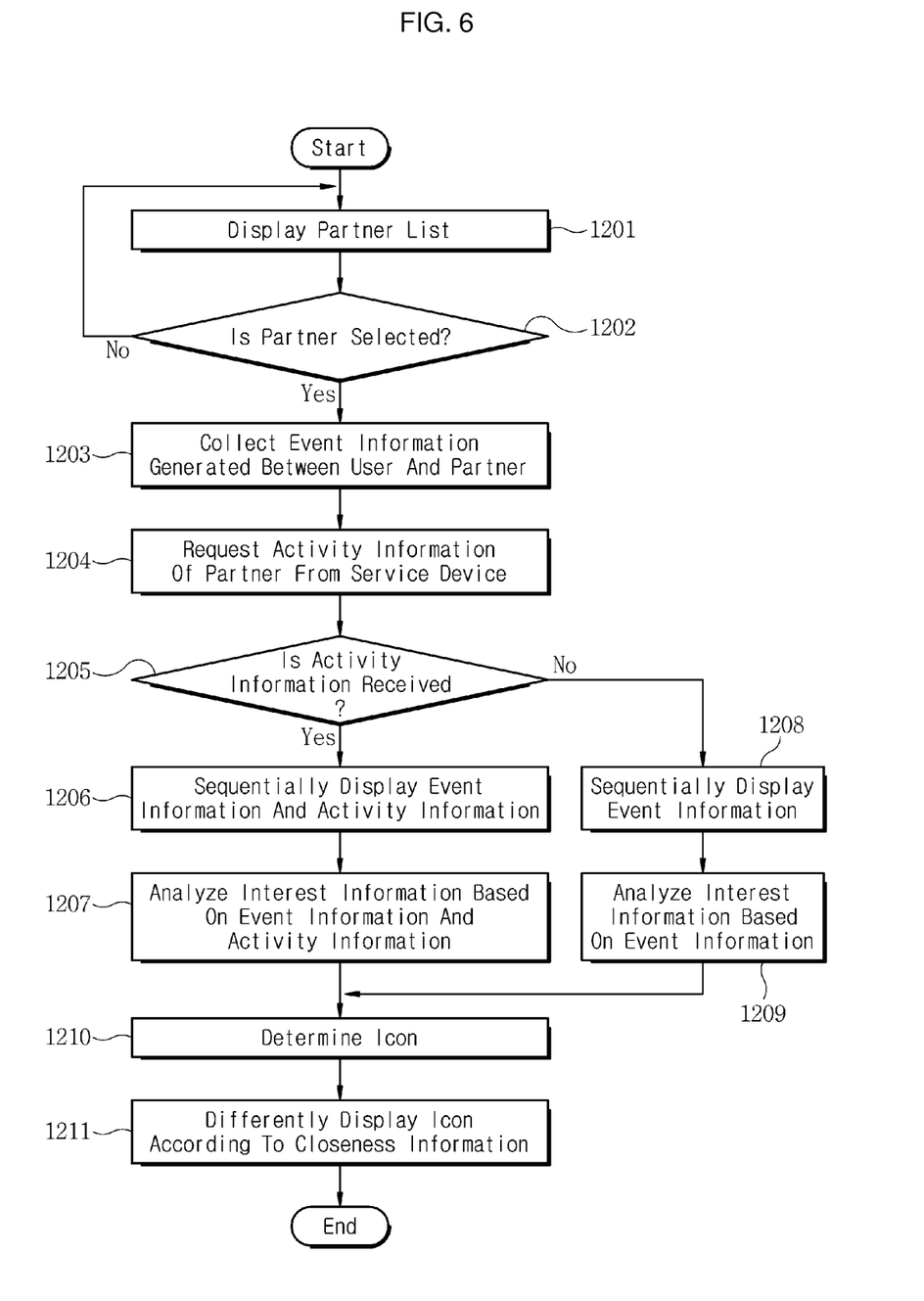
FIG. 6 is a flowchart illustrating a method of displaying interest information and closeness information in an address book information service according to another embodiment of the present invention.

FIG. 6 is a flowchart illustrating a method of displaying interest information and closeness information in an address book information service according to another embodiment of the present invention.

Hereinafter, for convenience of description, among the plurality of terminal devices 100 illustrated in FIG. 1, it is assumed and described that a terminal device of the user is a first terminal device 101, and a terminal device of a partner whose interest information and closeness information the user desires to receive is a second terminal device 102.

Figure 7:
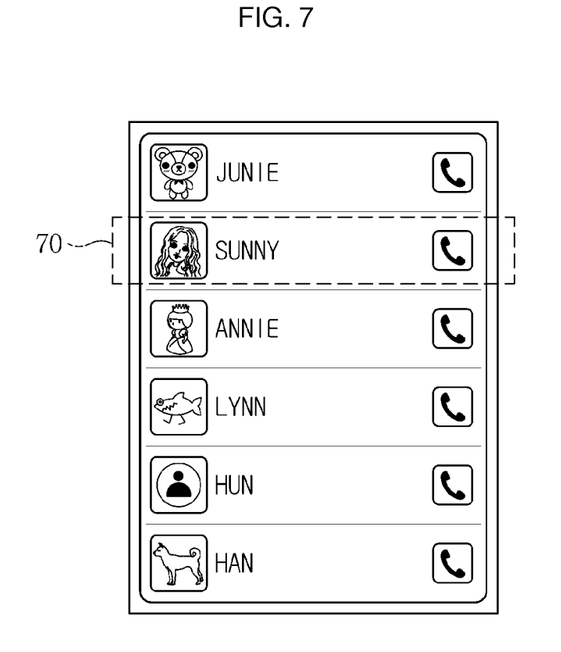
FIGS. 7 and 8 are exemplary diagrams illustrating an operation of displaying interest information and closeness information in an address book information service according to another embodiment of the present invention.

First, the first terminal device 101 displays identification information of a pre-stored partner, for example, a telephone number list, according to a request from the user of the first terminal device 101 (1201). That is, as illustrated in FIG. 7, by selecting a function such as the address book, it is possible to display identification information of a plurality of partners that are pre-registered in the address book.

Then, the first terminal device 101 determines whether a selection input to any partner among identification information of displayed partners is applied (1202). When a selection input to any partner is applied, for example, when a specific partner among the list is selected as displayed in 70 in FIG. 7, the first terminal device 101 collects pre-stored event information corresponding to the pre-stored identification information of the partner (1203).

Also, the first terminal device 101 requests activity information of the second terminal device 102 serving as a partner from the service device 200 (1204).

The service device 200 that has received the request identifies whether there is open activity information corresponding to the second terminal device 102, and when there is the information, transmits the activity information to the first terminal device 101, and the first terminal device 101 receives the information (1205).

Figure 8:
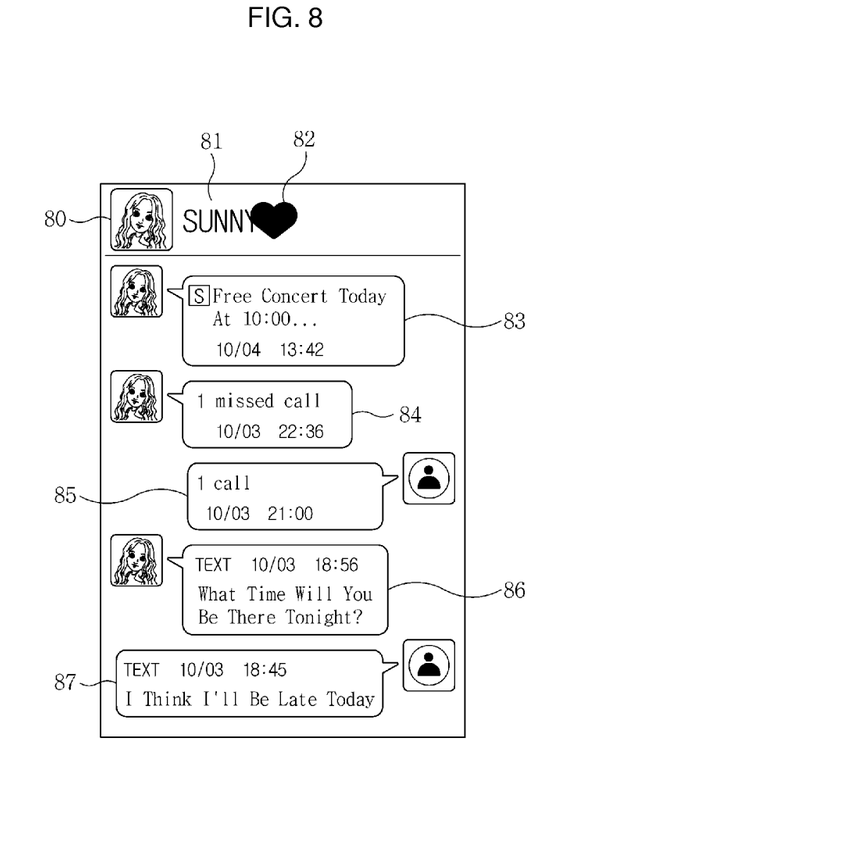

Then, event information and activity information are aligned and displayed based on generation time information (1206). FIG. 8 is a diagram illustrating an exemplary state in which the first terminal device 101 aligns and displays event information and activity information generated with a partner Sunny 81 in descending order based on generation time information.

Here, 83 indicates an example of activity information received from the service device 200, and 84 to 87 indicate examples of pre-stored event information in the first terminal device 101. In this case, 85 and 87 show a call event and a message event transmitted from the user of the first terminal device 101 to the second terminal device 102.

In this manner, the plurality of pieces of event information and activity information are aligned and displayed in an easily accessible manner corresponding to identification information of the user. Therefore, it is possible to increase user convenience.

Then, in operation 1207, interest information and closeness information are analyzed based on the event information and activity information. In other words, interest information is analyzed based on content of the event information and activity information, and closeness information may be analyzed based on the number of occurrences of event information. The closeness information may be separated and analyzed into grades. For example, when the number of occurrences of event information is 10 or more, closeness may be a grade 5. Whenever the number of occurrences of event information is decreased by 2, the grade of closeness may be decreased by 2.

Based on the analysis result, a pre-stored icon is set to correspond to interest information, and closeness information may be expressed by changing the icon (1210 and 1211).

For example, 82 in FIG. 8 is an icon that is displayed such that closeness information between the first terminal device 101 and the second terminal device 102 corresponds to interest information.

Figure 9:
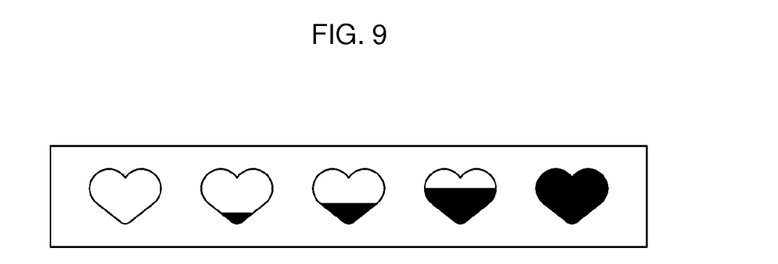
FIGS. 9 and 10 are exemplary diagrams illustrating closeness information displayed through an icon corresponding to interest information in an address book information service according to another embodiment of the present invention.
Figure 10:
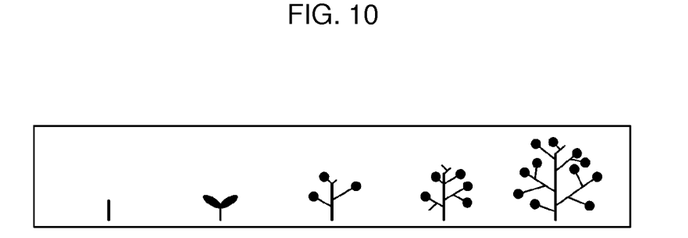

In this case, as illustrated in FIG. 9, according to the grade of the closeness information, a degree to which the icon is filled may be differently displayed. As illustrated in FIG. 10, when an icon corresponding to the interest information is a tree, the tree may be displayed using a method in which the tree grows according to the closeness information. Also, when the interest information is a game, a weapon, clothes, or the like of a specific character may be changed according to the closeness information. The closeness information may be expressed using various methods.

Meanwhile, in operation 1205, when activity information of the second terminal device 102 is not received from the service device 200, the first terminal device 101 aligns and displays only event information generated with the second terminal device 102 (1208). Similarly, interest information and closeness information are analyzed based on content of the event information (1209). An icon corresponding to the interest information may be differently displayed according to the closeness information (1210 to 1211).

According to the above-described operations, the user may identify various events generated with the partner and activity information in an easily accessible manner in his or her terminal device, simultaneously identify interest information with the partner, and identify a degree of closeness in an easily accessible manner. Therefore, it is possible to provide a new additional service to the user.

While detailed embodiments have been described in the above description, several modifications may be performed without departing from the scope and spirit of the present invention. For example, the present invention has been described focusing on extraction of a keyword from content of event information and activity information and analysis of interest information, but the present invention is not limited thereto. The interest information may be extracted by reflecting a kind of the keyword, for example, whether the keyword is a positive keyword or a negative keyword. That is, even when a keyword of "celebrity" is shown several times in the event information and activity information, when the term near the "celebrity" includes a plurality of negative terms, it may be predicted that the user has a negative view of the "celebrity." Therefore, in this case, the "celebrity" may not be extracted as interest information, but a keyword that is the next frequently shown may be extracted as interest information.

Also, while the embodiment of the present invention has described an example in which the icon corresponding to interest information is differently displayed according to closeness information, it may be used as an item in various applications such as presenting an icon corresponding to interest information to a terminal of the partner according to closeness information.

The above-described method of an address book information service according to the present invention may be implemented as a computer readable code in a computer readable recording medium. The computer readable recording medium includes a hardware device that is specially made to store and perform a program instruction, for example, magnetic media such as a hard disk, a floppy disk, or a magnetic tape, optical media such as a compact disk read only memory (CD-ROM) or a digital video disk (DVD), magneto-optical media such as a floptical disk, a ROM, a random access memory (RAM), and a flash memory. Examples of the program instruction may include a machine code generated by a compiler and a high-level language code that can be executed in a computer using an interpreter. Such a hardware device may be configured as at least one software module in order to perform operations of the invention and vice versa.

Also, the computer readable recording medium may be distributed in computer systems connected via a network and the computer readable code may be stored and executed in a distributed manner. Also, functional programs, codes and code segments for implementing the present invention may be easily construed by programmers skilled in the art to which the present invention pertains.

A computer program (also referred to as a program, software, a software application, a script, or a code) that is provided in a device according to the invention and executes the method according to the invention may be implemented by any type of programming language that includes a compiled or interpreted language, or a prior or procedural language, and may be deployed as any type such as an independent program, a module, a component, or a subroutine, or including another unit appropriate for a computer environment. The computer program does not necessarily correspond to files of a file system. The program may be stored in a unit file provided for a requested program, in multiple interacting files (for example, files that store at least one module, a sub program, and some of a code), or in some of a file that includes another program or data (for example, at least one script stored in a markup language document). The computer program is located in one site or distributed over many sites so that it is deployed to be executed in mutually accessed multiple computers via a communication network or in a single computer.

The present invention relates to an address book information service system, and a method and device for an address book information service in the system. Using only category information input by the user, based on the user's location, new address book information of a nearby area corresponding to the category information may be received and automatically registered in the address book. Therefore, the user has no need to directly search to obtain the address book information. Even when the user moves to a new area, the user may easily identify new address book information such as a telephone number, an address, and the like of a business of interest, by executing only the address book.

The present invention is a beneficial invention that is applied to the field of address book information services and in which new address book information may be received based on the user's location and automatically registered in the address book. Accordingly, the present invention can contribute to the development of service industries.

Also, the present invention collects event information such as calls and text generated between the user and the partner and activity information on the web of the partner using the terminal, displays the event information and activity information in an easily accessible manner, and may easily analyze interest information and closeness information between the user and the partner.

Also, the present invention can contribute to the development of service industries through these operations, has a high probability of commercialization or sale, is clearly implementable in reality, and thus has industrial applicability.

The embodiments disclosed in this specification and drawings are only examples to help understanding of the invention and the invention is not limited thereto. It is apparent to those skilled in the art that various modifications based on the technological scope of the invention in addition to the embodiments disclosed herein can be made.

What is claimed is:

1. A service device for an address book information service, comprising:
  a communication unit configured to communicate with terminal devices connected via a communication network for the address book information service; and
  a control unit configured to
    identify group information and user information contained in a service request message received from the terminal devices through the communication unit,
    recognize a user location of the terminal devices by using the identified user information,
    search for new address book information corresponding to category information included in the group information based on the recognized user location, and
    transmit the new address book information to the terminal devices through the communication unit so as to automatically register the new address book information in an address book of the terminal device,
  wherein the control units is configure to
    collect, when a request for interest information and closeness information of a partner is received from a first terminal device of a user,
      event information generated between the first terminal device of the user and a second terminal device of the partner, and
      activity information of the partner from at least one preset community service device,
    analyze the interest information and closeness information between the user and the partner based on the collected event information and activity information, and
    transmit, to the first terminal device, an icon corresponding to the analyzed interest information in which the closeness information is reflected, and the collected event information and activity information.

2. The service device according to claim 1,
wherein the control unit uses call history information of the first terminal device and address book information of the user related to the group information, and searches for the new address book information of a nearby area according to the recognized user location in association with the address book information that is previously used by the user.

3. The service device according to claim 1,
wherein the event information includes any of call and message events generated with the second terminal device, and
wherein the activity information is content information that is opened by the partner among content information written by the partner using a community service including at least one of a personal content service and a social network service (SNS).

* * * * *